United States Patent
Bakker et al.

(10) Patent No.: US 7,227,579 B2
(45) Date of Patent: Jun. 5, 2007

(54) LIGHT MODULATION REMOVER

(75) Inventors: Johannes Nicolaas Bakker, Eindhoven (NL); Gerard De Haan, Eindhoven (NL); Jeroen Maria Kettenis, Hamburg (DE); Perry Gerard Mevissen, Eindhoven (NL); Olukayode Anthony Ojo, Eindhoven (NL); Johannes Henricus Jozef Maria Van Rooy, Breda (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 842 days.

(21) Appl. No.: 09/819,279

(22) Filed: Mar. 28, 2001

(65) Prior Publication Data
US 2001/0033334 A1 Oct. 25, 2001

(30) Foreign Application Priority Data
Mar. 30, 2000 (EP) .................................. 00106807

(51) Int. Cl.
*H04N 5/235* (2006.01)
*H04N 9/73* (2006.01)
*H04N 5/222* (2006.01)
(52) U.S. Cl. ..................... 348/362; 348/226.1; 348/370
(58) Field of Classification Search ............. 348/226.1, 348/227.1, 362, 370, 448, 910, 447
See application file for complete search history.

(56) References Cited

U.S. PATENT DOCUMENTS

| | | | | | |
|---|---|---|---|---|---|
| 5,204,741 | A | * | 4/1993 | Sakaguchi | ............... 348/208.6 |
| 5,892,551 | A | * | 4/1999 | Uematsu | ..................... 348/447 |
| 5,926,216 | A | * | 7/1999 | Nobuoka | ..................... 348/297 |
| 5,960,153 | A | | 9/1999 | Oster et al. | .................. 386/117 |
| 6,154,258 | A | * | 11/2000 | Ohtsuka | .................. 348/226.1 |
| 6,380,985 | B1 | * | 4/2002 | Callahan | ..................... 348/607 |
| 6,489,998 | B1 | * | 12/2002 | Thompson et al. | ......... 348/448 |
| 6,519,002 | B1 | * | 2/2003 | Tomaszewski | ........... 348/226.1 |
| 6,630,953 | B1 | * | 10/2003 | Toyoda et al. | ........... 348/226.1 |
| 6,657,659 | B1 | * | 12/2003 | Van Rooy et al. | ....... 348/226.1 |

FOREIGN PATENT DOCUMENTS
WO 9956455 A2 11/1999

\* cited by examiner

*Primary Examiner*—David Ometz
*Assistant Examiner*—Luong T. Nguyen

(57) ABSTRACT

The quality of recorded images with for example a high speed camera can be detoriated by light modulation which is a consequence of for example gas-discharge lamps running at a lower frequency with respect to the camera.

A camera according to the invention provides light modulation removal by handling fields of the image different depending on the light modulation.

10 Claims, 3 Drawing Sheets

LIGHT MODULATION REMOVER

The invention relates to a camera as described in the preamble of Claim 1.

The invention further relates to a method of recording an image.

These cameras are known and are used for example to broadcast sport events etcetera. In such a case a camera can be used that runs at for example three times the normal picture rate (150/180 Hz). When such camera has to operate for example under artificial light, although in general much effort is paid to good light conditions, the camera can suffer from severe unwanted light modulation effects working under for example gas-discharge lamps.

A disadvantage of a camera working under such light conditions is that the 50/60 Hz beat frequency between the 150/180 Hz camera and the rectified-mains components in the light source (100/120 Hz) generates an unwanted modulation of the video signal. Even though the beat frequency itself is already visible, the recorded video is supposed to be viewed at normal speed, which down converts the beat frequency by a factor 3 (when the camera runs at three times the normal picture rate). When the camera has to operate under gas-discharge lamps the modulation can get even worse. To improve this situation it is proposed to spread the lamps over all the three available main-faces, but this still does not solve the problem. This is caused, for example because some objects are less illuminated or due to some reason reflect only one or two light faces. In consequence, a complex unwanted light modulation of the images is the result. An additional problem is the light changing color temperature during the cyclic discharge of the lamp.

It is inter alia an object of the invention to provide a camera and a method, which does not have the disadvantages of the prior art camera. It is further an object to provide light modulation removal means for use in such a camera system.

This is achieved according to the invention by a camera as described in Claim 1. The solution is proposed by the camera according to the invention, which is based on the processing of the images during the least common multiple of the camera acquisition and the rectified mains-period. This beat frequency period separates images having the same light modulation, the only difference here are the effects of movement on the scene. An embodiment of the invention is described in the dependent Claims.

These and other objects of the invention will be elucidated with reference to the Figures.

Figure 1:
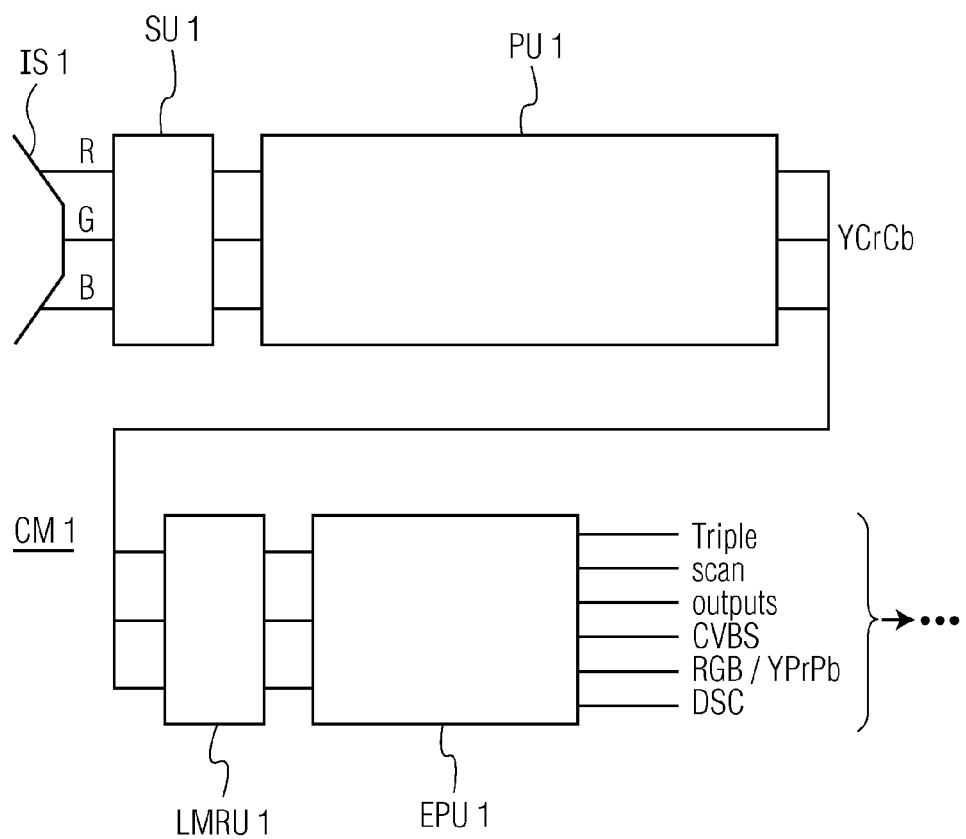
FIG. 1 shows a schematic embodiment of a camera according to the invention.
Figure 2A:
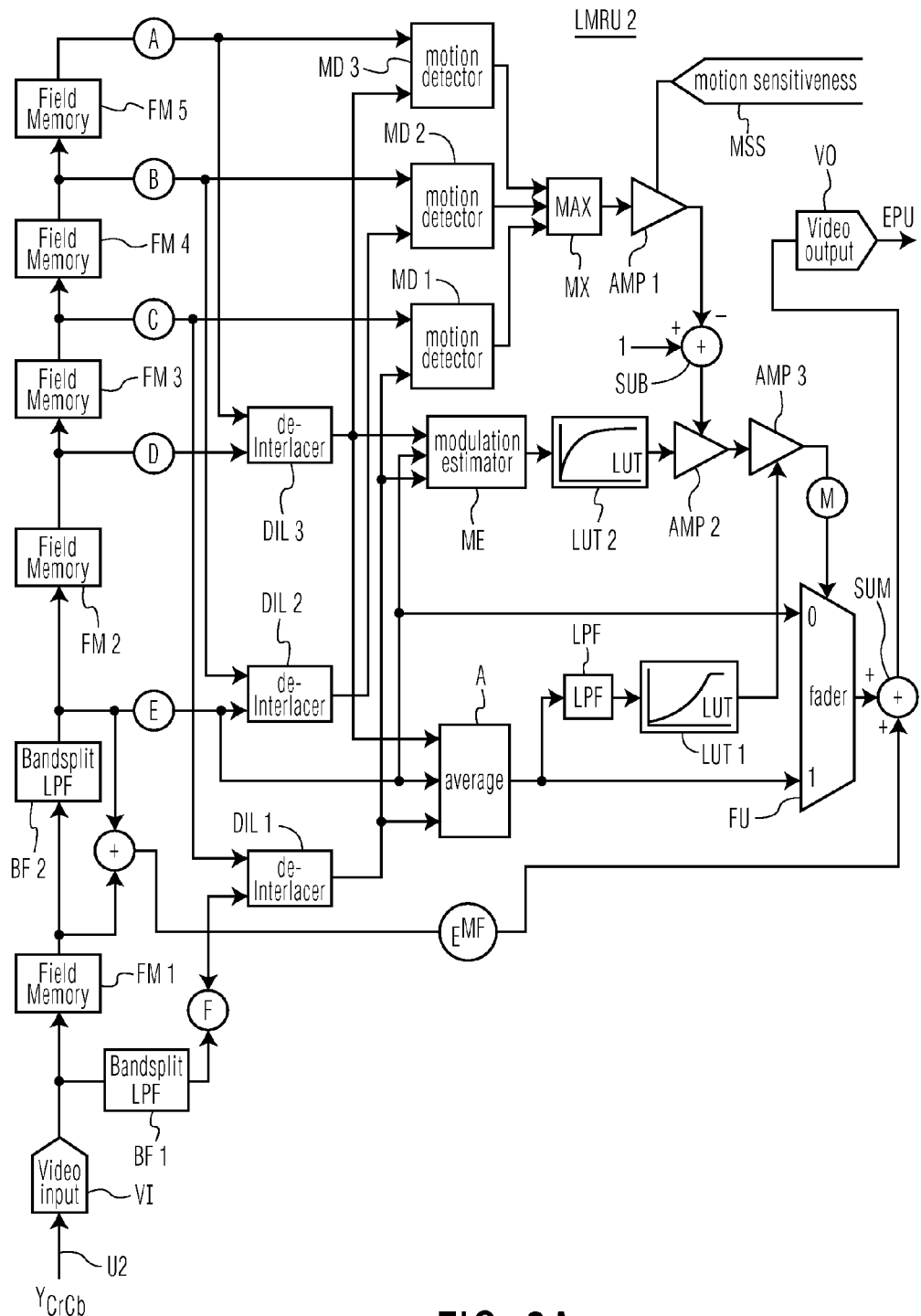
FIG. 2 shows an embodiment of a light modulation removal unit according to the invention.
Figure 2B:
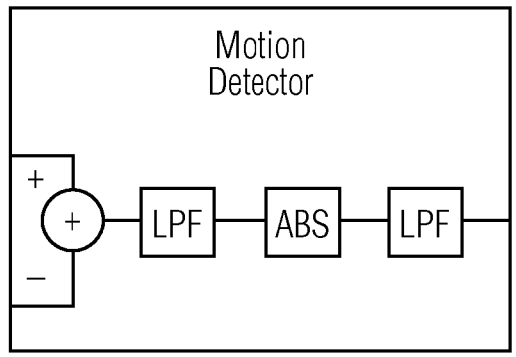
Figure 2C:
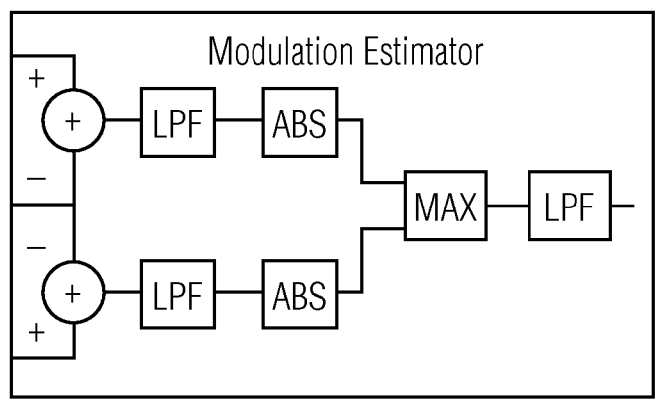
Figure 2D:
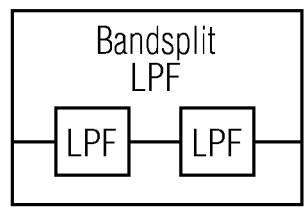

FIG. 1 shows a schematic embodiment of a camera CM1 according to the invention. The camera comprises an image sensor IS1 which supplies RGB signals to a sensor unit SU1. The sensor unit is coupled to a processing unit PU1 for processing the received RGB signals and supplying YCrCb signals to a light modulation removal unit LMRU1 which is coupled to an end processing unit EPU1. The output of the end processing unit supplies the signals which are known by the man skilled in the art and for example are coupled to a recording device, etc. The light modulation removal unit LMRU1 will be described in more detail with reference to FIG. 2 hereafter.

FIG. 2 shows in more detail block schematic a light modulation removal unit LMRU2 according to the invention. At a video input VI the light modulation removal unit receives the YCrCb signals from the processing unit PU1 (see FIG. 1). The light modulation removal unit LMRU2 comprises different parts. A first part having in this example five field memories FM1–FM5 for storing different fields of the received signal. A second part comprising of(in this example) three de-interlacers DIL1–DIL3. Further a part having three motion detectors MD1–MD3. Further a part having a modulation estimator ME and a part having an averager A. After the different fields are stored in the field memories FM1–FM5 the fields are supplied to three de-interlacers whereby the first de-interlacer DIL1 receives at a first input the input signals after filtered in a band split filter BF1 and at a second input the output signals of FM3. The second de-interlacer DIL2 receives at a first input the output signals of FM1 after filtering in a second band split filter BF2 and at a second input receives the output signal of a field memory FM4. The third de-interlacer DIL3 receives at the first input signals at output of field memory FM2 and at the second input the output signals after field memory FM5. The output of the de-interlacers DIL1–DIL3 is supplied as a first input to respectively motion detector MD1–MD3. At the second input the motion detector MD1 receives the output signal of field memory FM3. At a second input the motion detector MD2 receives the output signal of FM4 and the second input of motion detector MD3 receives the output signal of field memory FM5. The outpats of the motion detectors MD1–MD3 are supplied to a maximizer MX which supplies at the output the maximum of the three input signals. This output signal is supplied via an amplifier AMP1 to a subtractor at the negative input. The amplifier AMP1 receives at a control input a motion sensitive signal MSS.

The modulation estimator ME receives at a first input the output signal of the de-interlacer DIL1, at a second input the output signal of the band split filter BF2 and at the third input the output signal of the de-interlacer DIL3. The output of the modulation estimator ME is coupled via a unit LUT2 to an amplifier AMP2. At the control input the amplifier AMP2 receives the output signal of the subtractor SUB. The output of the amplifier AMP2 is coupled via a third amplifier AMP3 to a fader unit FU. The output of the fader unit is coupled via a summing unit SUM to the output VO of the light modulation removal unit LMRU2.

The averager A receives at the first input the output signal of the de-interlacer DIL1 at the second input the output signal of the band split filter BF2 and at the third input the output of the de-interlacer DIL3. The averager gives at the output the average of these three input signals to the fader unit FU and also via a low-pass filter LPF and a unit LUT1 to the amplifier AMP3 as a control signal.

In this way it is possible to remove the light modulations of the received input signals. The solution is based on the processing of the images during the smallest common product of the camera acquisition and the rectified-mains period. This beat frequency period separates images having the same light modulation; the only differences here are the effect of movement on the scene. Further, for stationary scenes, an average of the images during the beat frequency period gives a full removal of light modulation as a result.

As temporal averaging of pictures result in movement blur, a movement detector is used to fade the output between averages and original video. The movement detection is based on differences between fields with the same light modulation. A low-pass filter, to reduce decision noise, filters the max of differences of all light phases. Before feeding the motion control to the fader, a linear gain realizes a sensitiveness adjustment. The beat frequency is assumed equal to the standard field repetition divided by the highest common factor of field frequency and light frequency e.g. 150 Hz camera with light frequency 100 Hz (2× the main frequency)=150/HCF(150,100)=3 different illumination phases for acquisition. Having a 50 Hz camera with light frequency of 120 HZ, this results in 50/HCF(120,50)=5 fields.

In case the original images are available in interlaced format, consecutive picture can not just be averaged together without a serious reduction in vertical resolution of the respective video material. Using consecutive images of an interlaced video stream to extract image features like motion and others is also very difficult in images areas containing high vertical spatial frequencies. The reason for those problems is that two consecutive fields do not represent the same spatial position of the image. Therefore de-interlacing techniques have been used to restore the complete frame at each temporal position of the original image fields. In this way all spatial positions of the images are available for any processing at any needed input field time. To prevent the unwanted modulation, present on the original video images, of disturbing the de-interlacing process, the inputs are taken with a temporal distance equal to the said common period, in this way no modulation differences between both images is expected to be present.

Looking to stationary pictures, the quality of the averaged output depends on the used de-interlacer. In the case of a progressive input, the de-interlacer becomes redundant. Here averaging gives also a wanted noise reduction effect. For moving objects in the picture, the light modulation is still present. Although, in general, this concerns only small portions of the total disturbances, depending on the scene, their presence is still annoying. Up on that, the visibility of this residual light modulation is emphasized by the absence of the removed overall disturbances.

Moving areas with small details, where motion detection fails, are also averaged, leading to detail loss (e.g. grass during camera panning). To avoid this, estimation is made of the local strength of the light modulation. If no modulation is measured at the input of the average function the fader is set towards the original video.

To further reduce artifacts the averaging action is also made inversely proportional to the local luminance value. This can be introduced in the system due to the light flicker sensitivity of the human eye. Tempering the averaging action where the light modulation is already less visible.

A big improvement can be reached by applying motion compensation techniques, interpolating pictures from different light phases to the same time moment before averaging them together.

The invention claimed is:

1. Camera for recording pictures comprising an image sensor for receiving a picture, a processing unit for processing the picture and an end processing unit, characterized in that the camera comprises a light modulation removal means between the processing unit and the end processing unit for removing light modulation between different fields of the picture, by averaging stored images having the same light modulation, wherein said light modulation removal means further comprises a motion detector for detecting the effect of motion on a scene.

2. Camera as claimed in claim 1, characterized in that the light modulation removal means comprise adaptive fading means for fading between one field and at least n fields, whereby n is the repetition pattern of light modulation.

3. Camera as claimed in claim 2, characterized in that the light modulation removal means comprise means to calculate the lowest common multiple of the repetition period of an illumination variation and the repetition period of said picture, which lowest common multiple is used as common period to average consecutive images of said picture during recording.

4. Camera as claimed in claim 3, characterized in that the light modulation removal means comprises a motion detector and means to decrease the averaging of consecutive images when motion is detected, which motion detector comprises evaluation means to evaluate the local difference between images having a field difference of n.

5. Camera as claimed in claim 3, characterized in that the light modulation removal means comprises means to estimate the modulation strength on a locality of the image, and reducing means to reduce the averaging of consecutive images of localities where the light modulation is weak.

6. Camera as claimed in claim 3, characterized in that the light modulation means comprises means to reduce the averaging on localities where the luminance component of said picture is low.

7. Camera as claimed in claim 3, characterized in that means to exclude high spatial frequency components of the picture from an averaging step.

8. Camera as claimed in claim 3, characterized in that the light modulation removal means comprise means to correct consecutive images to the same temporal position using motion compensated conversion techniques prior to the averaging.

9. Camera as claimed in claim 1, characterized in that the light modulation removal means comprise de-interlacing means to generated information for any missing position in an original interlaced image, using two images with different interlace phases and equal light modulation phases.

10. Method of removing light modulation during recording pictures with an image sensor having the step of receiving a picture, processing the picture, removing the light modulation by storing different field of the picture and averaging the stored different fields in dependence of motion, and/or locations with low respectively high luminance locations, wherein the removing step further comprises averaging stored images having the same light modulation, and detecting the effect of motion on a scene.

* * * * *